(12) United States Patent
Peng et al.

(10) Patent No.: US 11,144,799 B2
(45) Date of Patent: Oct. 12, 2021

(54) IMAGE CLASSIFICATION METHOD, COMPUTER DEVICE AND MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiangjun Peng, Beijing (CN); Yunqi Wang, Beijing (CN); Chenxi Zhao, Beijing (CN); Yachong Xue, Beijing (CN); Gang Li, Beijing (CN); Yaoyu Lv, Beijing (CN); Shuo Zhang, Beijing (CN); Huidong He, Beijing (CN); Yadong Ding, Beijing (CN); Minglei Chu, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 16/556,697

(22) Filed: Aug. 30, 2019

(65) Prior Publication Data
US 2020/0285917 A1    Sep. 10, 2020

(30) Foreign Application Priority Data

Mar. 8, 2019    (CN) .......................... 201910175377.3

(51) Int. Cl.
*G06K 9/72*    (2006.01)
*G01N 21/88*    (2006.01)
(Continued)

(52) U.S. Cl.
CPC ......... *G06K 9/726* (2013.01); *G01N 21/8851* (2013.01); *G06K 9/6268* (2013.01);
(Continued)

(58) Field of Classification Search
None
See application file for complete search history.

(56) References Cited

U.S. PATENT DOCUMENTS

2012/0075638 A1\* 3/2012 Rollins .............. A61B 1/00009
356/479
2012/0290577 A1    11/2012 Cai et al.
(Continued)

FOREIGN PATENT DOCUMENTS

CN    102208038 A    10/2011
CN    102509110 A    6/2012
(Continued)

OTHER PUBLICATIONS

First Chinese Office Action dated Jul. 23, 2020, for corresponding Chinese Application No. 201910175377.3.
(Continued)

*Primary Examiner* — Kim Y Vu
*Assistant Examiner* — Nathan J Bloom
(74) *Attorney, Agent, or Firm* — Kinney & Lange, P.A.

(57) ABSTRACT

An image classification method, a computer device, and a medium are disclosed. The method includes: acquiring a middle-level semantic feature of an image to be classified through a visual dictionary; and classifying the image to be classified according to the middle-level semantic feature of the image to be classified using a classification model based on middle-level semantic features.

18 Claims, 3 Drawing Sheets

(51) Int. Cl.
*G06T 7/11* (2017.01)
*G06T 7/174* (2017.01)
*G06T 5/50* (2006.01)
*G06T 5/40* (2006.01)
*G06K 9/62* (2006.01)
*G06T 7/00* (2017.01)

(52) U.S. Cl.
CPC .................. *G06T 5/40* (2013.01); *G06T 5/50* (2013.01); *G06T 7/0008* (2013.01); *G06T 7/11* (2017.01); *G06T 7/174* (2017.01); *G01N 2021/8854* (2013.01); *G06T 2207/20081* (2013.01)

(56) References Cited

U.S. PATENT DOCUMENTS

2013/0080426 A1* 3/2013 Chen ..................... G06F 16/583
 707/723
2016/0132754 A1* 5/2016 Akhbardeh ........ G06K 9/00771
 382/103
2019/0331301 A1* 10/2019 Du .......................... E01C 23/01

FOREIGN PATENT DOCUMENTS

| CN | 104850859 A | 8/2015 |
| CN | 107515905 A | 12/2017 |

OTHER PUBLICATIONS

Liu Yuhuan, "Product Defect Detection Based on Computer Vision", Mar. 2018.

* cited by examiner

IMAGE CLASSIFICATION METHOD, COMPUTER DEVICE AND MEDIUM

CROSS-REFERENCE TO RELATED APPLICATION(S)

This application claims priority to the Chinese Patent Application No. CN201910175377.3, filed on Mar. 8, 2019, which is incorporated herein by reference in its entirety.

TECHNICAL FIELD

The present disclosure relates to the field of image processing technology, and more particularly, to an image classification method, a computer device, and a medium.

BACKGROUND

In the production of display screens, not only display screen defects need to be detected, but also the display screen defects need to be classified and statistics need to be compiled on types of the display screen defects to analyze causes of the defects, thereby improving the industrial production methods and improving the yield of the production of the display screens. Since all the classification methods for the display screen defects are based on a low-level feature of a target to be classified contained in an image, this results in a large amount of calculation and low efficiency for image classification, and difficulty in ensuring accuracy and robustness.

SUMMARY

According to a first aspect of the embodiments of the present disclosure, there is provided an image classification method, comprising:
acquiring a middle-level semantic feature of an image to be classified through a visual dictionary; and
classifying the image to be classified according to the middle-level semantic feature of the image to be classified using a classification model based on middle-level semantic features.

In an embodiment, acquiring a middle-level semantic feature of an image to be classified through a visual dictionary comprises:
acquiring a target to be classified contained in the image to be classified;
extracting a low-level feature of the target to be classified contained in the image to be classified; and
acquiring the middle-level semantic feature of the image to be classified according to the low-level feature through the visual dictionary.

In an embodiment, acquiring a target to be classified contained in the image to be classified comprises: acquiring the target to be classified contained in the image to be classified through image segmentation.

In an embodiment, the image segmentation is implemented using a minimum circumscribed rectangle algorithm.

In an embodiment, the low-level feature is a histogram of oriented gradient feature.

In an embodiment, acquiring the middle-level semantic feature of the image to be classified according to the low-level feature through the visual dictionary comprises: acquiring, according to the low-level feature, a visual word which has the closest Euclidean distance to the histogram of oriented gradient feature of the target to be classified contained in the image to be classified as the middle-level semantic feature of the image to be classified.

In an embodiment, before acquiring the target to be classified contained in the image to be classified, the method further comprises: performing image enhancement on the image to be classified.

In an embodiment, performing image enhancement comprises: performing graying, wavelet de-noising, otsu threshold segmentation, binary expansion, median filtering, and binary corrosion in sequence.

In an embodiment, before acquiring a middle-level semantic feature of an image to be classified through a visual dictionary, the method further comprises:
acquiring targets to be classified contained in a plurality of training images, extracting low-level features of the targets to be classified contained in the plurality of training images, and constructing the visual dictionary according to the low-level features of the targets to be classified contained in the plurality of training images.

In an embodiment, before classifying the image to be classified according to the middle-level semantic feature of the image to be classified using a classification model based on middle-level semantic features, the method further comprises:
acquiring middle-level semantic features of the plurality of training images according to the low-level features of the targets to be classified contained in the plurality of training images through the visual dictionary; and
training the middle-level semantic features of the plurality of training images as training samples using a machine learning algorithm to obtain the classification model based on the middle-level semantic features.

In an embodiment, acquiring the targets to be classified contained in the plurality of training images comprises: acquiring the targets to be classified contained in the plurality of training images through image segmentation.

In an embodiment, the image segmentation is implemented using a minimum circumscribed rectangle algorithm.

In an embodiment, the low-level features are histogram of oriented gradient features.

In an embodiment, constructing the visual dictionary according to the low-level features of the targets to be classified contained in the plurality of training images comprises: clustering histogram of oriented gradient features of the targets to be classified contained in the plurality of training images using a K-means algorithm to obtain visual words, and constructing the visual dictionary according to the visual words.

In an embodiment, acquiring middle-level semantic features of the plurality of training images according to the low-level features of the targets to be classified contained in the plurality of training images through the visual dictionary comprises: acquiring, according to the low-level features, visual words which have the closest Euclidean distances to the histogram of oriented gradient features of the targets to be classified contained in the plurality of training images as the middle-level semantic features of the plurality of training images.

In an embodiment, before acquiring the targets to be classified contained in the plurality of training images, the method further comprises: performing image enhancement on the plurality of training images.

In an embodiment, performing image enhancement comprises: performing graying, wavelet de-noising, otsu threshold segmentation, binary expansion, median filtering, and binary corrosion in sequence.

According to a second aspect of the embodiments of the present disclosure, there is provided a computer device comprising a memory, a processor, and a computer program stored on the memory and operative on the processor, wherein the program, when executed by the processor, implements the image classification method according to the first aspect of the present disclosure.

According to a third aspect of the embodiments of the present disclosure, there is provided a computer readable storage medium having stored thereon a computer program, wherein the program, when executed by a processor, implements the image classification method according to the first aspect of the present disclosure.

BRIEF DESCRIPTION OF THE ACCOMPANYING DRAWINGS

Specific embodiments of the present disclosure will be further described in detail below with reference to the accompanying drawings.

DETAILED DESCRIPTION

In order to explain the present disclosure more clearly, the present disclosure will be further described in conjunction with preferred embodiments and the accompanying drawings. Similar components in the accompanying drawings are denoted by the same reference signs. It should be understood by those skilled in the art that the following detailed description is illustrative and is non-restrictive, and should not be used to limit the protection scope of the present disclosure.

Classification of display screen defects is taken as an example. There are many types of display screen defects, which are generally classified into spot defects, line defects and mura defects. The spot defects comprise dark spots, bright spots etc., the line defects comprise film defects, scratches etc., and the mura defects comprise glass breakage, liquid leakage etc. When camera parameters, a shooting mode, and a shooting environment of a camera change while the camera collects a display image of a display screen under test, low-level features of the same type of defects in the image, such as geometric shapes, textures, local description etc., may also change accordingly. Currently, in order to ensure the accuracy of the classification of the display screen defects, it is necessary to acquire features of the display screen defects in a case of various camera parameters, shooting modes and shooting environments, that is, the classification needs to be performed after the collection is performed under different factors respectively, which leads to the need to model, store and extract a large number of low-level features in the process of classification, thereby resulting in a complicated workflow, and a large amount of calculation and low efficiency for classification.

Figure 1:
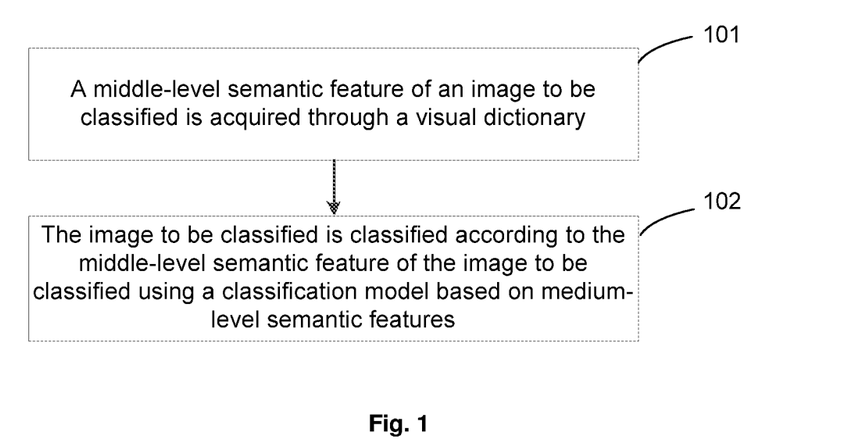
FIG. 1 illustrates a flowchart of an image classification method according to an embodiment of the present disclosure.

As shown in FIG. 1, an embodiment of the present disclosure provides an image classification method.

In step 101, a middle-level semantic feature of an image to be classified is acquired through a visual dictionary.

In step 102, the image to be classified is classified according to the middle-level semantic feature of the image to be classified using a classification model based on middle-level semantic features.

With the image classification method according to the present disclosure, the middle-level semantic feature of the image to be classified is acquired and the image is classified based on the middle-level semantic feature of the image to be classified, which reduces a semantic gap between a low-level feature and a high-level feature, and has advantages such as high accuracy, high robustness, high efficiency etc. Furthermore computer storage space and a large amount of calculation can be reduced.

In an embodiment, acquiring a middle-level semantic feature of an image to be classified through a visual dictionary further comprises:

acquiring a target to be classified contained in the image to be classified;

extracting a low-level feature of the target to be classified contained in the image to be classified; and acquiring the middle-level semantic feature of the image to be classified according to the low-level feature of the target to be classified contained in the image to be classified through the visual dictionary.

An image has hierarchical features. Low-level features are basic features of the image, and represent objective features of the image. During extraction, the low-level features are extracted based on an image level without any prior knowledge. Currently, low-level features of images which are widely used currently comprise geometric shapes, textures, local invariant features, transform domain features, etc. Middle-level features are middle-level semantic features obtained by analyzing a statistical distribution of the low-level features, and comprise a bag of visual words and a semantic topic. High-level features are more abstract semantics of the image, which correspond to behavioral semantics, emotional semantics, and scene semantics etc. The scene semantics describe content of the image, the behavioral semantics describe motion information in the image, and the emotional semantics describe emotions, such as happiness. sadness etc. which are transferred by the image to humans.

With the image classification method according to the present embodiment, the middle-level semantic feature of the image to be classified is formed by analyzing a statistical distribution of the low-level feature of the target to be classified contained in the image to be classified, i.e., establishing a relationship with semantics by analyzing a statistical distribution of the low-level feature, which reduces a semantic gap between a low-level feature and a high-level feature, and has advantages such as high accuracy, high robustness, high efficiency etc. Furthermore computer storage space and a large amount of calculation can be reduced.

In some implementations of the present embodiment, before acquiring the target to be classified contained in the image to be classified, the method further comprises: performing image enhancement on the image to be classified.

With this implementation, the accuracy of the image classification may further be improved.

Figure 2:
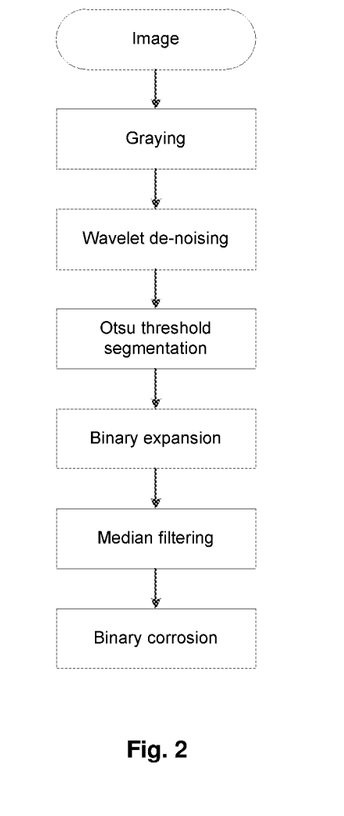
FIG. 2 illustrates a flowchart of performing image enhancement.

In some implementations of the present embodiment, as shown in FIG. 2, performing image enhancement on the image to be classified further comprises: performing graying, wavelet de-noising, otsu threshold segmentation, binary expansion, median filtering, and binary corrosion in sequence on the image to be classified. Here, the graying may greatly reduce the amount of calculation for subsequent image processing based on the distribution characteristics of brightness and chromaticity of the image. In a specific example, the image is grayed using a weighted average method in the present implementation, that is, assuming that three primary color component values of a RGB image are R, G, and B respectively, and a converted grayscale value of the image is GRAY, the grayscale value of the image is calculated according to GRAY=0.3R+0.59G+0.11B. The wavelet de-noising may highlight high-frequency information such as an edge, a structure etc. of the target to be classified contained in the image, and improve a contrast between the target to be classified and a background, thereby highlighting the target to be classified contained in the image. The otsu threshold segmentation is used to binarize the image. The median filtering may perform edge smoothing on the target contained in the binarized image. The binary expansion and the binary corrosion may remove holes and isolated false points from the binarized image.

In some implementations of the present embodiment, acquiring a target to be classified contained in the image to be classified further comprises: acquiring the target to be classified contained in the image to be classified through image segmentation.

In some implementations of the present embodiment, acquiring the target to be classified contained in the image to be classified through image segmentation further comprises: performing image segmentation on the image to be classified based on a minimum circumscribed rectangle algorithm, to obtain the target to be classified contained in the image to be classified.

In a specific example, a minimum circumscribed rectangle of the target contained in the image is obtained using a target rotation method. Specifically, the target contained in the image is rotated at equal intervals in a range of 90°, an area of a circumscribed rectangle parallel to a coordinate axis direction is calculated each time the target is rotated, a circumscribed rectangle with the smallest area is obtained as a minimum circumscribed rectangle of the target to be classified contained in the image, and then a region of the minimum circumscribed rectangle is segmented to obtain the target to be classified contained in the image.

In some implementations of the present embodiment, the low-level feature of the target to be classified contained in the image to be classified is a Histogram of Oriented Gradient (HOG) feature. The histogram of oriented gradient feature is composed of histograms of oriented gradient of local regions of the image. Gradients in an image or oriented densities of edges in the image may accurately represent shape attributes of local regions of the target to be classified. Therefore, the histogram of oriented gradient feature may be used as the low-level feature to ensure the accuracy of the image classification.

In a specific example, a flow of extracting an HOG feature is as follows.

An input image is normalized using a Gamma correction method to suppress noise interference. A Gamma compression formula is as follows:

$$I(x,y)=I(x,y)^{gamma}$$

where $I(x, y)$ is the minimum circumscribed rectangle of the target to be classified contained in the image which is obtained in the above example, and gamma=½.

(2) Gradients of pixels in horizontal and vertical directions of the image are calculated respectively, to obtain a vector of oriented gradient at a position of each pixel point, which is used to capture edge information of the target to be classified contained in the image, wherein in an image $I(x, y)$, a gradient at a pixel point $(x, y)$ in the horizontal direction is $G_x(x, y)$, and a gradient at the pixel point $(x, y)$ in the vertical direction is $G_y(x, y)$:

$$G_x(x,y)=I(x+1,y)-I(x-1,y) \text{ and}$$

$$G_y(x,y)=I(x,y+1)-I(x,y-1)$$

A magnitude value and an orientation of the gradient at the pixel point $(x, y)$ are as follows respectively:

$$G(x, y) = \sqrt{G_x(x, y)^2 + G_y(x, y)^2} \text{ and}$$

$$\alpha(x, y) = \tan^{-1}\frac{G_y(x, y)}{G_x(x, y)}.$$

(3) A gradient histogram is established, and specifically, the image is firstly divided into a plurality of cells, for example, cells each composed of 2*2 pixels, an orientation value of the gradient histogram is set to 0-180°, and a bin is obtained every 20°, wherein a weight of oriented gradient within the gradient histogram is determined by a magnitude value of the gradient.

(4) Several ones of the cells are grouped into one block, for example, 2*2 cells are grouped into one block, and gradient histogram features of all cells in one block are connected in series and normalized, wherein the cells are usually overlapped to some extent. Assuming that v denotes a gradient intensity distribution vector which is not normalized, a formula may be obtained by applying a normalization method as follows:

$$L2-norm: f = \frac{v}{\sqrt{\|v\|_2^2 + e^2}}$$

where e is a constant term with a small value.

(5) In the entire image, HOG features of all the blocks are combined to obtain the HOG feature describing the image.

In some implementations of the present embodiment, acquiring the middle-level semantic feature of the image to be classified according to the low-level feature of the target to be classified contained in the image to be classified through the visual dictionary further comprises: acquiring a visual word which has the closest Euclidean distance to the histogram of oriented gradient feature of the target to be classified contained in the image to be classified as the middle-level semantic feature of the image to be classified.

In some implementations of the present embodiment, before acquiring a middle-level semantic feature of an image to be classified through a visual dictionary, the method further comprises:
acquiring targets to be classified contained in a plurality of training images, extracting low-level features of the targets to be classified contained in the plurality of training images, and constructing the visual dictionary according to the low-level features of the targets to be classified contained in the plurality of training images.

In some implementations of the present embodiment, before acquiring the targets to be classified contained in the plurality of training images, the method further comprises: performing image enhancement on the plurality of training images.

In some implementations of the present embodiment, performing image enhancement on the plurality of training images further comprises: performing graying, wavelet denoising, otsu threshold segmentation, binary expansion, median filtering, and binary corrosion in sequence on the plurality of training images.

In some implementations of the present embodiment, before classifying the image to be classified according to the middle-level semantic feature of the image to be classified using a classification model based on middle-level semantic features, the method further comprises: acquiring middle-level semantic features of the plurality of training images according to the low-level features of the targets to be classified contained in the plurality of training images through the visual dictionary; and training the middle-level semantic features of the plurality of training images as training samples using a machine learning algorithm to obtain the classification model based on the middle-level semantic features.

In some implementations of the present embodiment, acquiring the targets to be classified contained in the plurality of training images further comprises: acquiring the targets to be classified contained in the plurality of training images through image segmentation.

In some implementations of the present embodiment, acquiring the targets to be classified contained in the plurality of training images through image segmentation further comprises: performing image segmentation on the plurality of training images based on a minimum circumscribed rectangle algorithm, to obtain the targets to be classified contained in the plurality of training images.

In some implementations of the present embodiment, the low-level features of the targets to be classified contained in the plurality of training images are histogram of oriented gradient features.

In some implementations of the present embodiment, constructing the visual dictionary according to the low-level features of the targets to be classified contained in the plurality of training images further comprises: clustering histogram of oriented gradient features of the targets to be classified contained in the plurality of training images using a K-means algorithm to obtain visual words, and constructing the visual dictionary according to the visual words.

In some implementations of the present embodiment, acquiring middle-level semantic features of the plurality of training images according to the low-level features of the targets to be classified contained in the plurality of training images through the visual dictionary comprises: acquiring visual words which have the closest Euclidean distances to the histogram of oriented gradient features of the targets to be classified contained in the plurality of training images as the middle-level semantic features of the plurality of training images.

It is beneficial to model the features of the target of the image by applying overall statistical information of the image in the image analysis without analyzing specific composition of the target to be classified contained in the image. A Bag of Words (BoW) model is such a middle-level feature representation method. The BoW model treats the image as a document composed of visual words, so that the BoW model and related theory in the field of text classification are applied to the understanding of the image, without analyzing and interpreting specific composition of targets in an object, and instead, a plurality of sample images are applied as training samples, low-level features of the sample images are quantized into visual words, and content of an unknown target is expressed using a distribution histogram of the visual words of the image.

Figure 3:
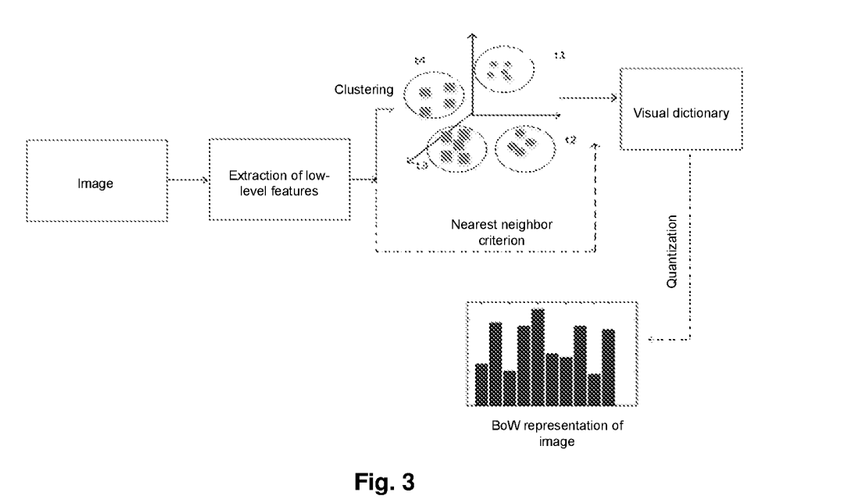
FIG. 3 illustrates a schematic diagram of constructing a visual dictionary according to low-level features of targets to be classified contained in a plurality of training images.

In a specific example, as shown in FIG. 3, the histogram of oriented gradient features of the targets to be classified contained in the plurality of training images are clustered using a K-means algorithm to obtain visual words, and a flow of constructing a visual dictionary according to the visual words is as follows.

Visual words, for example, $t_1$, $t_2$, $t_3$, $t_4$ as shown in FIG. 3, are formed from the histogram of oriented gradient features of the targets to be classified contained in the plurality of training images using the K-means algorithm. In fact, $t_1$, $t_2$, $t_3$, $t_4$ are centroids of clusters, and all the visual words form a visual dictionary. The K-means algorithm is an unsupervised machine learning algorithm. When clustering is performed using the algorithm, N objects are divided into k classes based on a criterion that there is a high similarity within the classes and a low similarity between the classes. A specific flow is as follows.

(1) Extracted features of various objects of interest form a feature space: $X=[x_1, x_2, \ldots, x_N]$, where $x_n \in R^d$ is a low-level feature.

(2) k cluster centers $u_1, u_2, \ldots, u_k$ are randomly selected;

(3) Distances from each low-level feature $x_i$ to the cluster centers are calculated, then each feature is re-clustered to a cluster center nearest thereto, and $R_k$ records feature tags contained in class k:

$$R_k = \{i | \|x_i - u_k\| \leq \|x_i - u_l\|, k \neq l\}, k=1, 2, \ldots, K$$

Thereby, the targets are re-clustered into k classes $\{R_1, R_2, \ldots, R_k\}$.

(4) A center of each new class is re-calculated and the visual dictionary is updated:

$$u_k = \frac{1}{|R_k|} \sum_{i \in R_k} x_i$$

(5) The above steps are repeated until the convergence requirements are met to obtain an optimal visual dictionary:

$$U = \{u_1, u_2, \ldots, u_k\}, u_k \in R^d.$$

A specific flow of acquiring a visual word which has the closest Euclidean distance to the histogram of oriented gradient feature of the target to be classified contained in the image to be classified as the middle-level semantic feature of the image to be classified is as follows.

A histogram of visual words is extracted. According to the nearest neighbor criterion, each feature is quantized into a visual word having the closest Euclidean distance thereto. A formula is expressed as follows:

$$\min_V \|X - UV\|_2^2,$$
$$\text{s.t. } \|v_i\|_0 = \|v_i\|_1 = 1$$

where X is a low-level feature space of each image, U is a visual dictionary obtained by K-means clustering, V represents a correspondence relationship between low-level features and visual words, a conditional constraint $\|v_i\|_0 = 1$ indicates that there may only be one non-zero value in a vector $v_i$, a conditional constraint $\|v_i\|_1=1$ indicates that a cumulative sum of absolute values of numbers in the vector $v_i$ is 1, and thereby $\|v_i\|_0=\|v_i\|_1=1$ defines that there is only one "1" in the vector $v_i$, that is, a low-level feature may be quantized into a visual word having the closest Euclidean distance thereto.

Then, a histogram of visual words of each image is:

$$V_i=[v_1+v_2+\ldots+v_k], v_k \in R^{k\times 1}$$

The histogram of the visual words is the middle-level semantic feature of the image, and is applied to sample images. Firstly, low-level features of targets to be classified contained in the images are quantized into visual words, and then content of the unknown targets is expressed by a distribution histogram of the visual words of the images. Since overall statistical information of the images is applied to the middle-level semantic feature without analyzing specific composition of the targets contained in the images, there are high accuracy and high robustness in modeling the features of the targets of the images.

It may be understood that visual words having the closest Euclidean distances to the histogram of oriented gradient features of the targets to be classified contained in the plurality of training images may be acquired as middle-level semantic features of the plurality of training images in a specific flow similar to that described above, and will not be described in detail here.

In some implementations of the present embodiment, a machine learning algorithm is an SVM algorithm. In a specific example, the middle-level semantic features of the plurality of training images are trained using a linear SVM classifier to obtain a classification model based on the middle-level semantic features, and an image to be classified is classified according to the classification model based on the middle-level semantic features, to obtain a result of the image classification.

Figure 4:
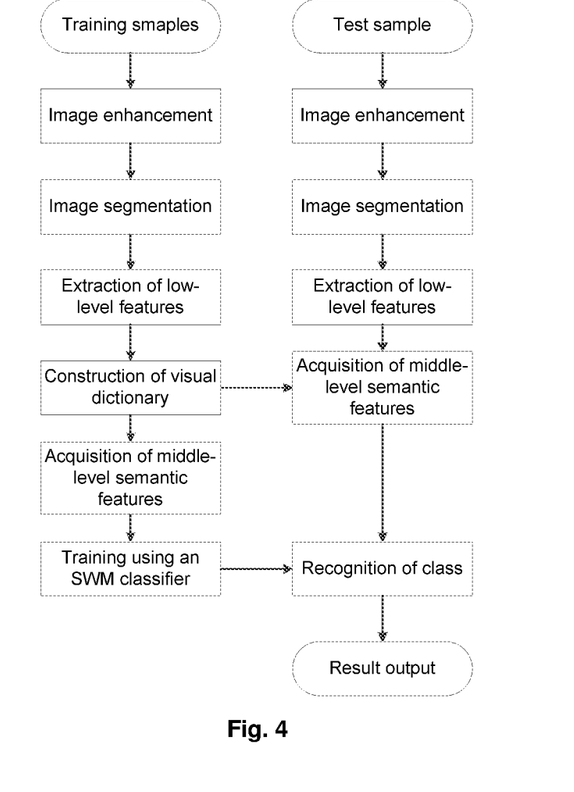
FIG. 4 illustrates a flowchart of an image classification method for classifying display screen defects according to an embodiment of the present disclosure.

In a specific example, as shown in FIG. 4, when the image classification method according to the present embodiment is applied to the classification of display screen defects, a specific flow of the method is as follows.

A plurality of first display images (i.e., a plurality of training images) of a plurality of first display screens under test (which usually display an image in a pure color, so that a target to be classified different from a background represents a display screen defect) and at least one second display image (i.e., an image to be classified) of at least one second display screen under test having a display screen defect to be classified are collected respectively, the first display images are used as training samples, and the second display image is used as a test sample, wherein, "under test" indicates that the display screen displays a test image, and a camera collects the test image displayed on the display screen to classify the display screen defect.

Image enhancement is performed on the training samples and the test sample respectively.

Display screen defect targets contained in the training samples and the test sample are obtained through image segmentation respectively.

Low-level features of the display screen defect targets of the training samples and the test sample are extracted respectively.

A visual dictionary is constructed according to the low-level features of the display screen defect targets of the training samples, and middle-level semantic features of the training samples and the test sample are acquired according to the visual dictionary respectively.

The middle-level semantic features of the training samples are trained using a machine learning algorithm to obtain a classification model, and the test sample is classified according to the middle-level semantic feature of the test sample using the classification model.

Feature extraction is a key step in the classification of display screen defects. Low-level features such as geometry, textures, shapes, local descriptors etc. used in the existing display screen defect classification method based on image classification are extracted based on information at an image level. Since the feature extraction has not been sufficiently generalized and abstracted, it is far from a concept level, display screen defect classification based on low-level features is not highly accurate, and it is difficult to accurately classify an image having a defect outside a training set.

With the flow in the present example, the middle-level semantic feature is formed by analyzing a statistical distribution of the low-level feature of the display screen defect target, i.e., establishing a relationship with semantics by analyzing a statistical distribution of the low-level feature, which reduces a semantic gap between a low-level feature and a high-level feature, avoids the influence on the classification of display screen defects by factors such as camera parameters, a shooting mode and a shooting environment etc. of a camera when the camera collects a display image of a display screen under test, solves the problem of large intra-class variation when the classification of display screen defects is performed based on the low-level feature, has advantages such as high accuracy, high robustness, high efficiency, etc., and thus has a good foundation for subsequent analysis of causes of the display screen defects, improvement of industrial production methods, and improvement of the yield of the production of display screens. Furthermore computer storage space and a large amount of calculation can be reduced In another description, the specific flow of the present example comprises two phases, which are a training phase and a classification phase respectively.

In the training phase, a plurality of first display images of a plurality of first display screens under test are collected, and the first display images are used as training samples;

image enhancement is performed on the training samples;

display screen defect targets of the training samples are obtained through image segmentation;

low-level features of the display screen defect targets of the training samples are extracted;

a visual dictionary is constructed according to the low-level features of the display screen defect targets of the training samples, and middle-level semantic features of the training samples are acquired through the visual dictionary; and the middle-level semantic features of the training samples are trained using a machine learning algorithm to obtain a classification model.

In the classification phase, at least one second display image of at least one second display screen to be classified under test is collected, and the second display image is used as a test sample;

image enhancement is performed on the test sample;

a display screen defect target of the test sample is obtained through image segmentation;

a low-level feature of the display screen defect target of the test sample is extracted;

a middle-level semantic feature of the test sample is acquired through the visual dictionary; and the test sample is classified using the classification model according to the middle-level semantic feature of the test sample.

Figure 5:
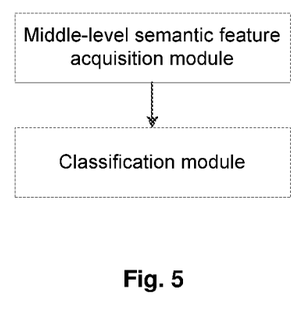
FIG. 5 illustrates a schematic diagram of an image classification system according to an embodiment of the present disclosure.

As shown in FIG. 5, another embodiment of the present disclosure provides an image classification system which performs the image classification method described above, comprising:

a middle-level semantic feature acquisition module configured to acquire a middle-level semantic feature of a target to be classified in an image to be classified through a visual dictionary; and a classification module configured to classify the image to be classified according to the middle-level semantic feature of the image to be classified using a classification model based on middle-level semantic features.

It should be illustrated that the principle and the working flow of the image classification system according to the present embodiment are similar to those of the image classification method described above, and related description may be known with reference to the above description, and will not be described in detail here.

Figure 6:
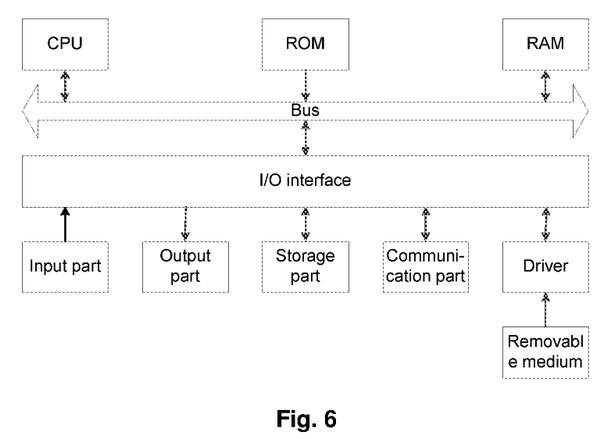
FIG. 6 illustrates a schematic structural diagram of a computer system for performing image classification according to an embodiment of the present disclosure.

As shown in FIG. 6, illustrated is a computer system suitable for implementing the image classification system according to the present embodiment, comprising a Central Processing Unit (CPU) which may perform various appropriate actions and processes based on a program stored in a Read Only Memory (ROM) or a program loaded from a storage portion into a Random Access Memory (RAM). Various programs and data required for operations of a computer system are also stored in the RAM. The CPU, the ROM, and the RAM are connected to each other through a bus. An Input/Output (I/O) interface is also connected to the bus.

The following components are connected to the I/O interface: an input part comprising a keyboard, a mouse, etc.; an output part comprising a Liquid Crystal Display (LCD), etc., and a speaker; a storage part comprising a hard disk etc.; and a communication part comprising a network interface card such as a LAN card, a modem, etc. The communication part performs communication processing via a network such as the Internet. The driver is also connected to the I/O interface as needed. A removable medium, such as a magnetic disk, an optical disk, a magneto-optical disk, a semiconductor memory etc., is mounted on the driver as needed, so that a computer program read therefrom is installed into the storage part as needed.

Particularly, according to the present embodiment, the processes described above in the flowcharts may be implemented as a computer software program. For example, the present embodiment comprises a computer program product comprising a computer program included tangibly on a computer readable medium, the computer program comprising program codes for performing the methods illustrated in the above flowcharts. In such an embodiment, the computer program may be downloaded and installed from the network via a communication portion, and/or installed from a removable medium.

The flowcharts and diagrams in the accompanying drawings illustrate architecture, functions, and operations of possible implementations of systems, methods, and computer program products according to the present embodiment. In this regard, each block of the flowcharts or diagrams may represent a module, a program segment, or a portion of codes, which comprises one or more executable instructions for implementing specified logic functions. It should also be illustrated that in some alternative implementations, the functions illustrated in the blocks may also occur in a different order than that illustrated in the accompanying drawings. For example, two successively represented blocks may in fact be executed substantially in parallel, or they may sometimes be executed in a reverse order, depending upon functionality involved. It is also illustrated that each block of the diagrams and/or flowcharts, and combinations of blocks in the diagrams and/or flowcharts, may be implemented by a dedicated hardware-based system which performs specified functions or operations, or may be implemented by combination of dedicated hardware and computer instructions.

Modules described in the present embodiment may be implemented by software, or may be implemented by hardware, and the described modules may also be disposed in a processor. For example, there may be a description of a processor, comprising a middle-level semantic feature acquisition module and a classification module. Here, names of these modules do not in any way constitute a limitation on the modules themselves. For example, the middle-level semantic feature acquisition module may also be described as "visual dictionary module".

In another aspect, the present embodiment further provides a non-volatile computer storage medium, which may be a non-volatile computer storage medium included in the above apparatus in the above embodiments; or may exist separately but is not assembled into a non-volatile computer storage medium in a terminal. The above non-volatile computer storage medium stores one or more programs which, when executed by a device, cause the device to:

acquire a middle-level semantic feature of an image to be classified through a visual dictionary; and classify the image to be classified according to the middle-level semantic feature of the image to be classified using a classification model based on middle-level semantic features.

It should also be illustrated that in the description of the present disclosure, relational terms such as first and second, etc. are only used to distinguish one entity or operation from another entity or operation without necessarily requiring or implying that there is any such actual relationship or order between these entities or operations. Moreover, the terms "comprises", "includes" or any other variation thereof are intended to cover a non-exclusive inclusion, so that a process, method, article, or device which comprises a series of elements comprises not only these elements but also comprises other elements which are not explicitly listed, or elements inherent to such a process, method, article, or device. In a case of no more limitation, an element defined by a sentence "including one . . . " does not exclude that there is another element which is the same as the element in the process, the method, the article, or the device including the element.

It should be understood that the above embodiments of the present disclosure are merely examples for clearly illustrating the present disclosure, and are not limitations on the embodiments of the present disclosure. For those of ordinary skill in the art, other changes or modifications in other forms can also be made based on the above description. All embodiments cannot be exhaustively described herein, and any obvious changes or modifications derived from the technical solutions of the present disclosure are still within the protection scope of the present disclosure.

We claim:

1. An image classification method, comprising:
   acquiring a target to be classified contained in the image to be classified;

extracting a low-level feature of the target to be classified contained in the image to be classified;

acquiring a middle-level semantic feature of an image to be classified according to the low-level feature through a visual dictionary; and classifying the image to be classified according to the middle-level semantic feature of the image to be classified using a classification model based on middle-level semantic features wherein the low-level feature comprises geometric shapes, textures, local invariant features, and transform domain features, and the middle-level semantic feature comprises a bag of visual words and a semantic topic.

2. The method according to claim 1, wherein acquiring a target to be classified contained in the image to be classified comprises: acquiring the target to be classified contained in the image to be classified through image segmentation.

3. The method according to claim 2, wherein the image segmentation is implemented using a minimum circumscribed rectangle algorithm.

4. The method according to claim 3, wherein the low-level feature is a histogram of oriented gradient feature.

5. The method according to claim 4, wherein acquiring the middle-level semantic feature of the image to be classified according to the low-level feature through the visual dictionary comprises:

acquiring, according to the low-level feature, a visual word which has a closest Euclidean distance to the histogram of oriented gradient feature of the target to be classified contained in the image to be classified as the middle-level semantic feature of the image to be classified.

6. The method according to claim 1, wherein before acquiring the target to be classified contained in the image to be classified, the method further comprises:

performing image enhancement on the image to be classified.

7. The method according to claim 6, wherein performing image enhancement comprises: performing graying, wavelet de-noising, otsu threshold segmentation, binary expansion, median filtering, and binary corrosion in sequence.

8. The method according to claim 1, wherein before acquiring a middle-level semantic feature of an image to be classified through a visual dictionary, the method further comprises:

acquiring targets to be classified contained in a plurality of training images, extracting low-level features of the targets to be classified contained in the plurality of training images, and constructing the visual dictionary according to the low-level features of the targets to be classified contained in the plurality of training images.

9. The method according to claim 8, wherein before classifying the image to be classified according to the middle-level semantic feature of the image to be classified using a classification model based on middle-level semantic features, the method further comprises:

acquiring middle-level semantic features of the plurality of training images according to the low-level features of the targets to be classified contained in the plurality of training images through the visual dictionary; and training the middle-level semantic features of the plurality of training images as training samples using a machine learning algorithm to obtain the classification model based on the middle-level semantic features.

10. The method according to claim 9, wherein acquiring the targets to be classified contained in the plurality of training images comprises: acquiring the targets to be classified contained in the plurality of training images through image segmentation.

11. The method according to claim 10, wherein:

the image segmentation is implemented using a minimum circumscribed rectangle algorithm.

12. The method according to claim 11, wherein the low-level features are histogram of oriented gradient features.

13. The method according to claim 12, wherein constructing the visual dictionary according to the low-level features of the targets to be classified contained in the plurality of training images comprises:

clustering histogram of oriented gradient features of the targets to be classified contained in the plurality of training images using a K-means algorithm to obtain visual words; and constructing the visual dictionary according to the visual words.

14. The method according to claim 13, wherein acquiring middle-level semantic features of the plurality of training images according to the low-level features of the targets to be classified contained in the plurality of training images through the visual dictionary comprises:

acquiring, according to the low-level features, visual words which have closest Euclidean distances to the histogram of oriented gradient features of the targets to be classified contained in the plurality of training images as the middle-level semantic features of the plurality of training images.

15. The method according to claim 8, wherein before acquiring the targets to be classified contained in the plurality of training images, the method further comprises: performing image enhancement on the plurality of training images.

16. The method according to claim 15, wherein performing image enhancement comprises: performing graying, wavelet de-noising, otsu threshold segmentation, binary expansion, median filtering, and binary corrosion in sequence.

17. A computer device comprising a memory, a processor, and a computer program stored on the memory and operative on the processor, wherein the program, when executed by the processor, implements the method according to claim 1.

18. A non-transitory computer readable storage medium having stored thereon a computer program, wherein the program, when executed by a processor, implements the method according to claim 1.

* * * * *